US012397401B2

(12) United States Patent
Kiyohara et al.

(10) Patent No.: US 12,397,401 B2
(45) Date of Patent: Aug. 26, 2025

(54) WORKING MACHINE

(71) Applicant: Koki Holdings Co., Ltd., Tokyo (JP)

(72) Inventors: Daiki Kiyohara, Ibaraki (JP); Tetsuhito Shige, Ibaraki (JP); Hiroaki Irei, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 18/557,912

(22) PCT Filed: Mar. 25, 2022

(86) PCT No.: PCT/JP2022/014708
§ 371 (c)(1),
(2) Date: Oct. 27, 2023

(87) PCT Pub. No.: WO2022/230512
PCT Pub. Date: Nov. 3, 2022

(65) Prior Publication Data

US 2024/0217081 A1 Jul. 4, 2024

(30) Foreign Application Priority Data

Apr. 28, 2021 (JP) ................................ 2021-076211

(51) Int. Cl.
*B25C 1/06* (2006.01)
*B25C 1/00* (2006.01)

(52) U.S. Cl.
CPC ................ *B25C 1/06* (2013.01); *B25C 1/005* (2013.01)

(58) Field of Classification Search
CPC ............ B25C 1/005; B25C 1/008; B25C 1/06
(Continued)

(56) References Cited

U.S. PATENT DOCUMENTS

2006/0273131 A1 12/2006 Chen
2012/0111915 A1* 5/2012 Miyashita ................ B25C 1/06 227/8

(Continued)

FOREIGN PATENT DOCUMENTS

JP 2010-012580 A 1/2010
JP 2011-200992 A 10/2011

(Continued)

OTHER PUBLICATIONS

International Search Report & Written Opinion received in PCT Application No. PCT/JP2022/014708, dated Jun. 7, 2022 w/machine English translation.

(Continued)

*Primary Examiner* — Chinyere J Rushing-Tucker
(74) *Attorney, Agent, or Firm* — Rimon P.C.

(57) ABSTRACT

Workability and endurance of a working machine is improved with a simple configuration. A working machine includes: an ejecting portion 7; a striking portion 30 striking a fastener; and a magazine 20 feeding the fastener to the ejecting portion 7. The magazine 20 includes: a plate-shaped base member **20*a* extending in a front and back direction B1 and configured to catch the fastener to be movable in the front and back direction B1; a feeder 20*b* switchable between a contact state representing contact with the fastener caught with the base member 20*a* and a contactless state representing contactless with the fastener at time of movement in the front and back direction B1; and a guiding portion guiding movement of the feeder 20*b* in the front and back direction B1. The working machine includes a detector 21 detecting a position of the feeder 20*b* in the front and back direction B1**.

12 Claims, 16 Drawing Sheets

(58) Field of Classification Search
USPC .......................................................... 227/129
See application file for complete search history.

(56) References Cited

U.S. PATENT DOCUMENTS

2019/0217457 A1* 7/2019 Hung ...................... B25C 1/047
2024/0051102 A1* 2/2024 Zimmerman ........... B25C 1/008
2024/0075601 A1* 3/2024 Sikora ..................... B25C 1/005

FOREIGN PATENT DOCUMENTS

JP 2012-096331 A 5/2012
JP 2021-003777 A 1/2021

OTHER PUBLICATIONS

Notice of Reasons for Refusal received in corresponding Japanese Patent Application No. 2024-125671, dated Jun. 17, 2025.

* cited by examiner

WORKING MACHINE

TECHNICAL FIELD

The present invention relates to a working machine such as a driving device.

BACKGROUND ART

As an example of a working machine, a driving device including a magazine capable of housing a fastener is known. As an example of such a driving device, a Patent Document 1 describes a driving device including: a magazine housing a fastener; an ejecting portion to which the fastener is fed from the magazine; and a striking portion striking the fastener fed to the ejecting portion.

RELATED-ART DOCUMENT

Patent Document

Patent Document 1: Japanese Patent Application Laid-open Publication No. 2021-3777

SUMMARY OF THE INVENTION

Problems to be Solved by the Invention

The driving device described in the Patent Document 1 includes: a main body in which the magazine is fixed to the ejecting portion; and a guiding portion allowed to be housed in the main body and to slide in a front and back direction, and the guiding portion is provided with a feeder biasing the fastener toward the ejecting portion on the front side. When the fastener is supplied to the magazine, the guiding portion is slid backward with respect to the main body to load the fastener to the front side (close to the ejecting portion) of the feeder of the guiding portion. When the guiding portion is slid frontward in this state to be set to the main body, the fastener is biased frontward by the feeder.

The magazine as described above has a complicated structure, and therefore, it is necessary to more simplify the structure of the magazine. And, it is necessary to control detection of a remaining amount of the fasteners loaded in the magazine in the simple structure of the magazine to improve workability and endurance of the driving device.

An objective of the present invention is to provide a working machine having improved workability and endurance in a simple structure.

Means for Solving the Problems

A working machine of one embodiment includes: an ejecting portion; a striking portion striking a fastener fed to the ejecting portion; and a magazine feeding the fastener to the ejecting portion, the magazine includes: a base member configured to catch the fastener to be movable in a first direction; a feeder being movable in the first direction and biased toward one side in the first direction; and a guiding portion guiding movement of the feeder in the first direction, one side end of the base member in the first direction is attached to the ejecting portion while the other side end of the same in the first direction is open to allow the fastener to be caught or released, the feeder is switchable between a contact state representing contact with the fastener caught on the base member and a contactless state representing contactless with the fastener at time of movement in the first direction, and the working machine includes a detector detecting a position of the feeder in the first direction.

Effects of the Invention

According to the present invention, workability and endurance of a working machine are improved in a simple structure.

BRIEF DESCRIPTIONS OF THE DRAWINGS

FIG. 12A shows a switch OFF state, and FIG. 12B shows a switch ON state.

Figure 1:
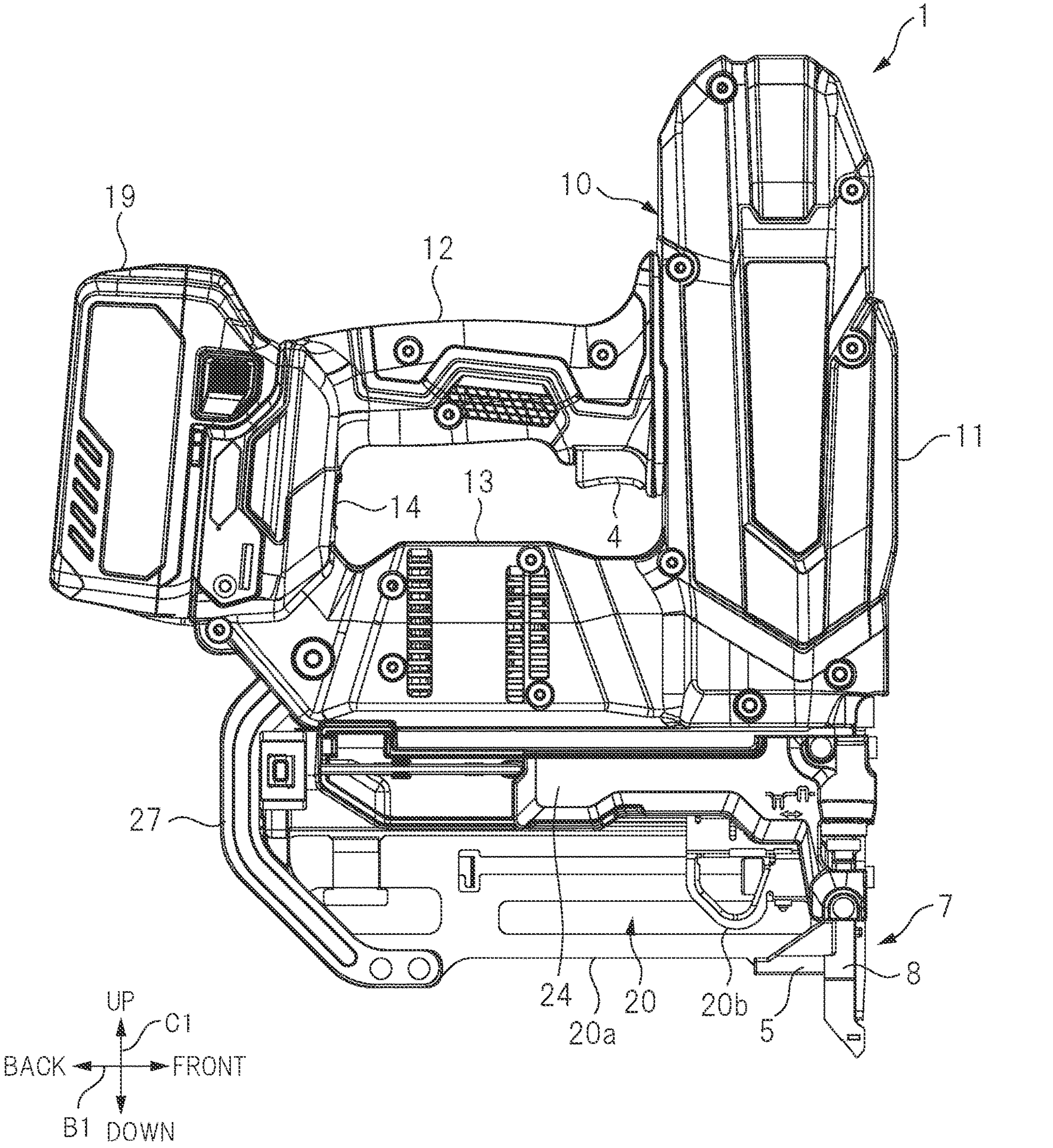
FIG. 1 is a side view showing a driving device that is one example of a working machine of an embodiment of the present invention.
Figure 2:
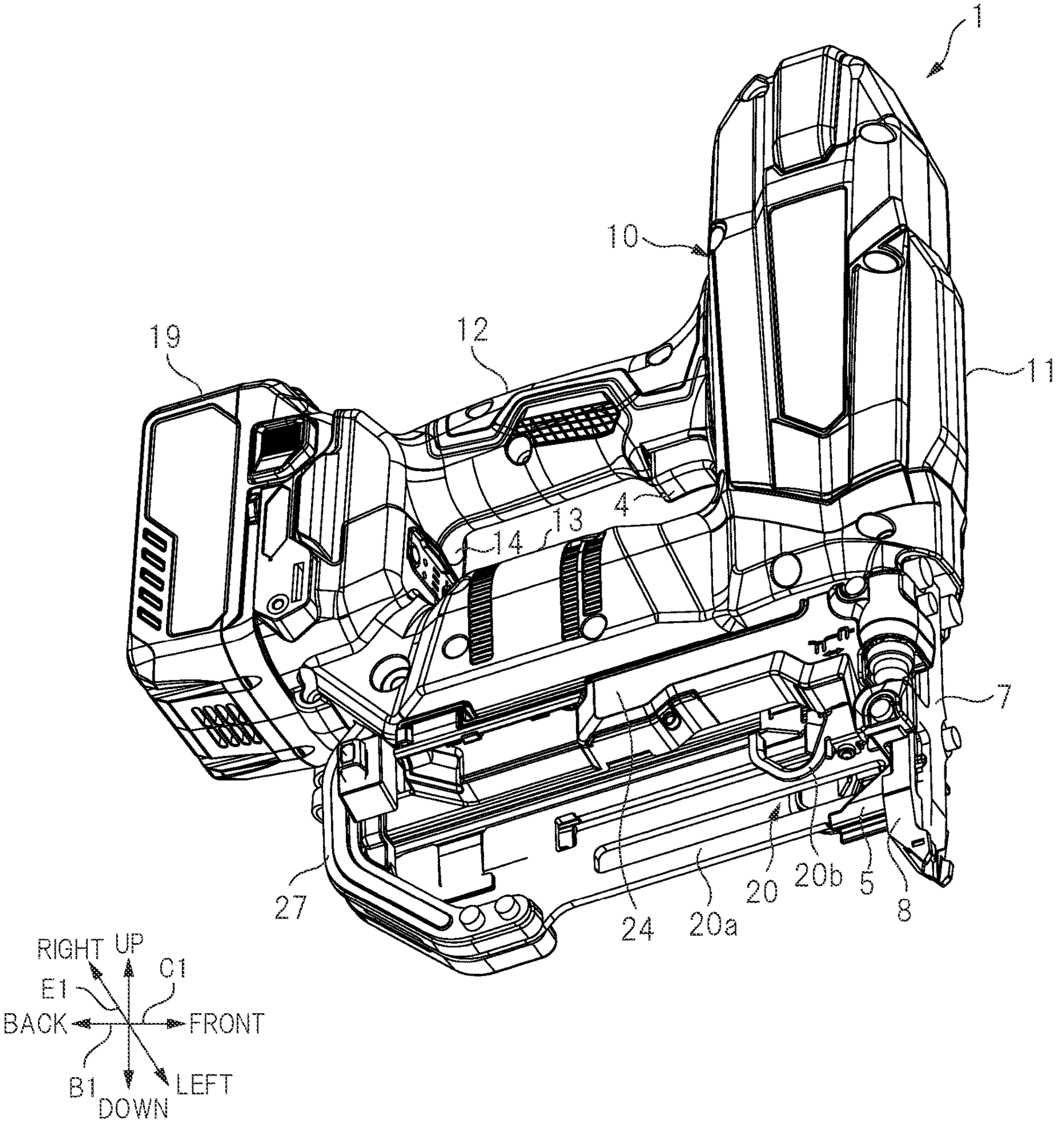
FIG. 2 is a perspective view showing appearance of the driving device shown in FIG. 1.
Figure 16A:
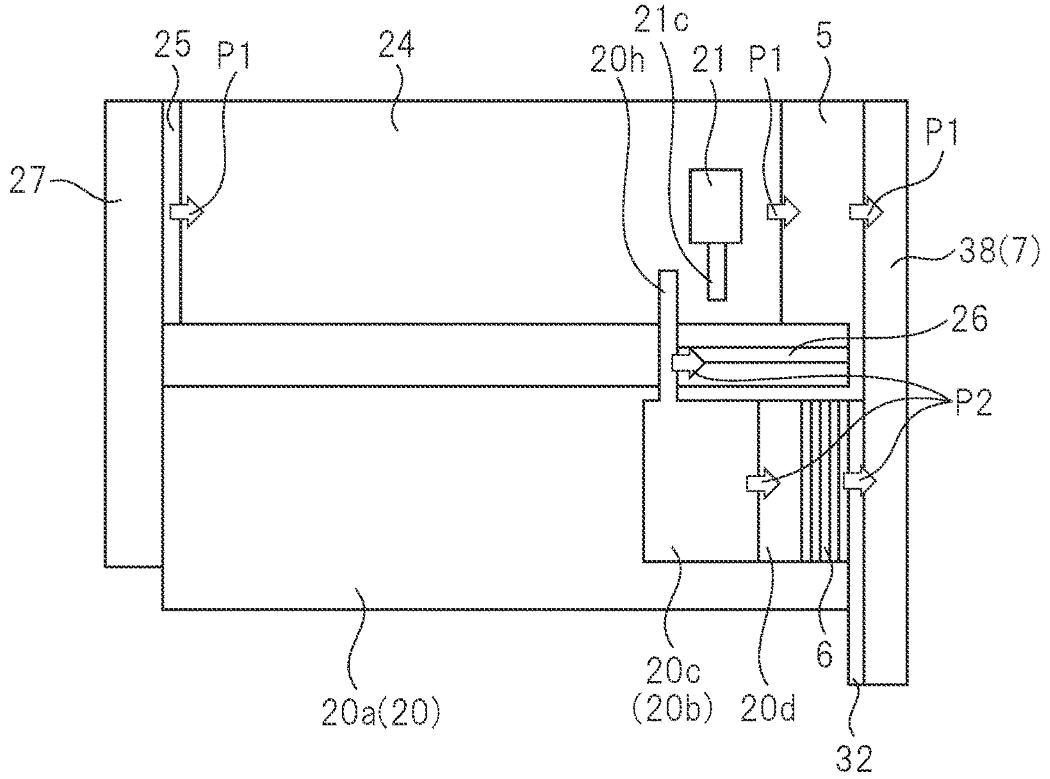
Figure 16B:
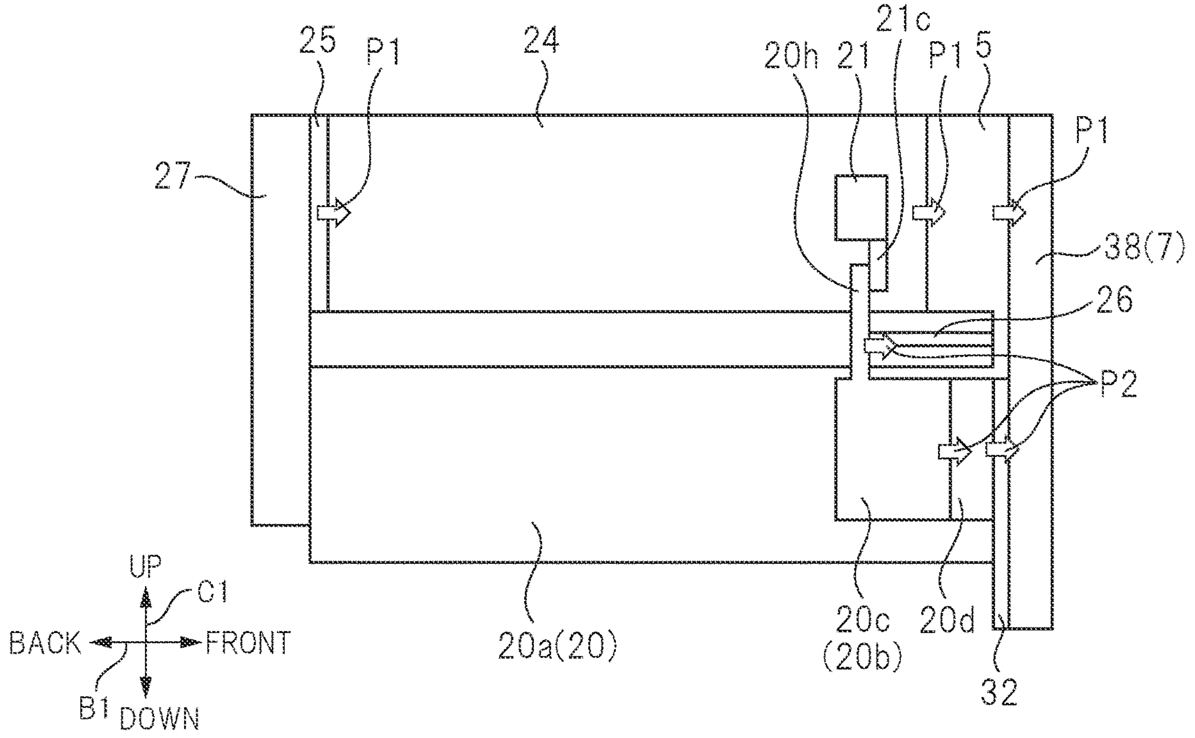

FIGS. 16A and 16B schematic view showing a rattling suppression structure of the driving device shown in FIG. 1, FIG. 16A shows a state with fastener catching, and FIG. 16B shows a state without the fastener.

BEST MODE FOR CARRYING OUT THE INVENTION

A working machine of the present embodiment will be explained with reference to drawings.

In the present embodiment, a driving device 1 will be exemplified and explained as an example of the working machine. The driving device 1 shown in FIGS. 1 to 6 is suitable for a driving-in operation for striking a fastener 6 such as a nail or staple (see FIG. 9) to a workpiece such as a wood member or a gypsum board.

The driving device 1 includes a housing 10 and a magazine 20. The housing 10 includes a main body housing 11, a handle 12, a motor case 13 and a joint 14. One ends of the handle 12 and the motor case 13 in a longitudinal direction are connected to the main body housing 11, and the other ends of the handle 12 and the motor case 13 in the longitudinal direction are connected to the joint 14. In other words, the main body housing 11, the handle 12, the motor case 13 and the joint 14 are unified.

Note that the housing 10 is made of a synthetic resin such as nylon or polycarbonate. The main body housing 11 of the housing 10 has a substantially square tube shape as a whole. In this case, a longitudinal direction of the main body housing 11 shown in FIG. 1 is defined as "up and down direction C1", and a longitudinal direction of the handle 12 and the motor case 13 is defined as "front and back direction B1". Also, a direction orthogonal to the up and down direction C1 and the front and back direction B1 is defined as "right and left direction E1" shown in FIG. 2. However, such definitions are definitions only for convenience in the explanation.

Based on the definitions, the handle 12 is positioned on the upper side of the motor case 13, and extends backward from one side (back side/back surface) of the main body housing 11. On the other hand, the motor case 13 is positioned on the lower side of the handle 12, and extends backward from one side (back side/back surface) of the main body housing 11. The joint 14 connects a back end of the handle 12 and a back end of the motor case 13. In other words, the front and back direction of the present embodiment is equivalent to an extending direction of the handle 12 in the present invention.

Figure 4:
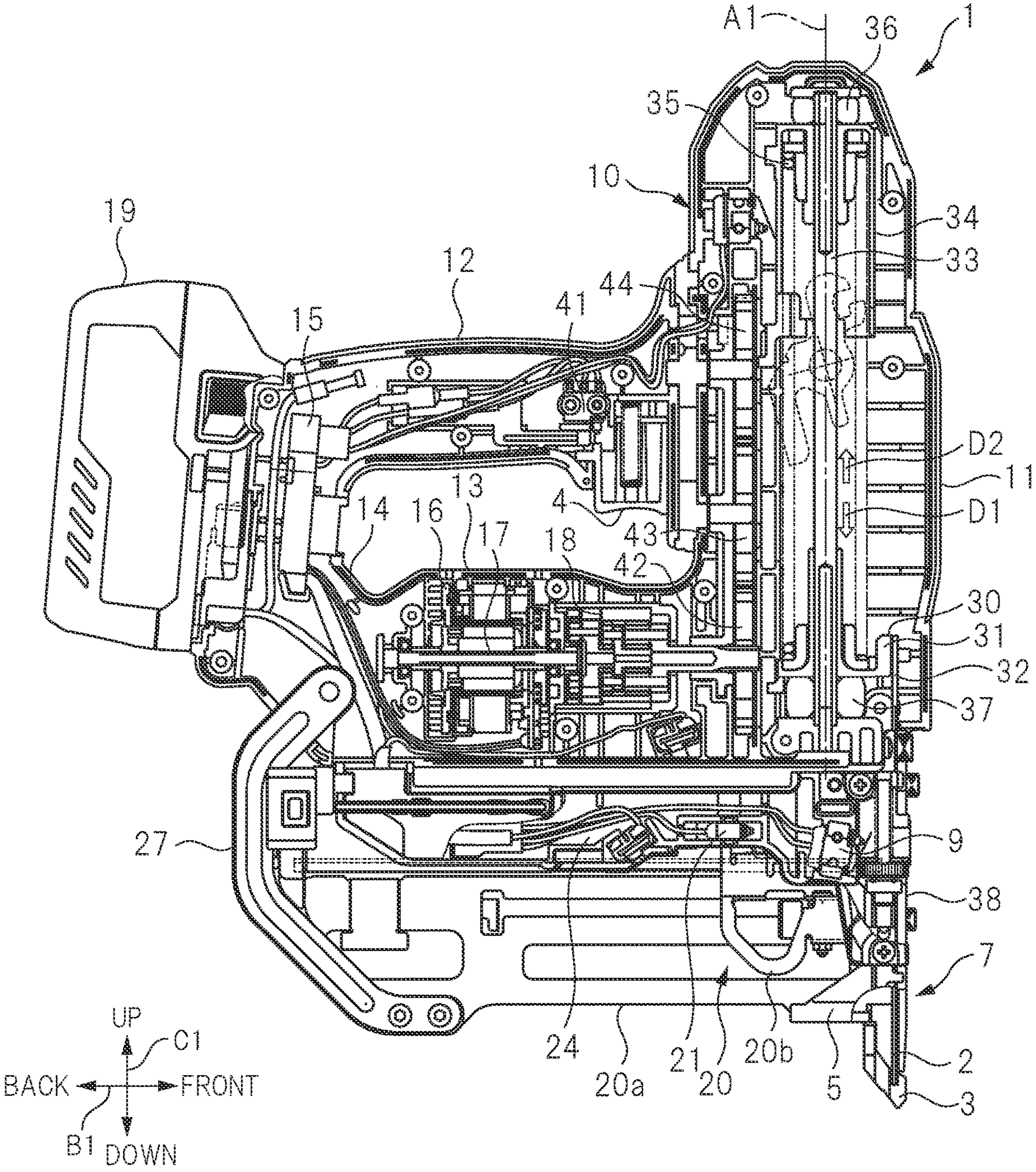
FIG. 4 is an explanatory view showing an internal structure of the driving device shown in FIG. 1.

The driving device 1 includes a striking portion 30 as shown in FIG. 4. The striking portion 30 includes a plunger 31 arranged inside the main body housing 11, and a driver blade 32 fixed to the plunger 31. The driver blade 32 is made of metal. And, a guide shaft 33 is fixed into the main body housing 11. A center line A1 is center of the guide shaft 33. The plunger 31 is attached to the guide shaft 33, and the striking portion 30 is movable in a direction along the center line A1.

As shown in FIG. 1, an ejecting portion 7 is attached to the main body housing 11 to be exposed to outside of this main body housing 11. The ejecting portion 7 can be also defined as a nose portion. The striking portion 30 strikes the fastener 6 fed to the ejecting portion 7. As shown in FIG. 4, the ejecting portion 7 includes a blade guide 5 and a guide plate 38. The blade guide 5 may be made of either metal or synthetic resin. The ejecting portion 7 is provided with an ejecting path 2 formed by the blade guide 5. The ejecting path 2 may be any of a groove, a path, a hole, a gap and a space. The driver blade 32 is movable inside the ejecting path 2.

As shown in FIG. 1, a push lever 8 is attached to a proximity of a tip of the ejecting portion 7. The push lever 8 is movable and stoppable with respect to the ejecting portion 7. Further, the push lever 8 can contact to/separate from the workpiece. As shown in FIG. 4, the ejecting portion 7 prevents the driver blade 32 from moving in a direction crossing the center line A1 when being in contact with the driver blade 32.

A weight 34 suppresses backlash received by the housing 10. The weight 34 is made of, for example, metal. The weight 34 is attached to the guide shaft 33, and is movable in the direction along the center line A1.

A metallic spring 35 is arranged inside the main body housing 11, and the spring 35 is arranged between the plunger 31 and the weight 34 in the direction along the center line A1. From the spring 35, a biasing force toward a downside D1 to be close to the ejecting portion 7 is exerted on the plunger 31 in the direction along the center line A1. From the spring 35, a biasing force toward an upside D2 to be separate from the ejecting portion 7 is exerted on the weight 34 in the direction along the center line A1. A weight bumper 36 and a plunger bumper 37 are arranged inside the main body housing 11. Each of the weight bumper 36 and the plunger bumper 37 is made of synthetic rubber.

A battery pack 19 that is a power supply is mounted to be attachable to/detachable from the joint 14. When a motor shaft 17 is rotated forward by application of a voltage from the battery pack 19 to an electrical motor 16, a rotary force of the motor shaft 17 is transmitted to a first gear 42. A rotary force of the first gear 42 is transmitted to a third gear 44 through a second gear 43.

A controller 15 is arranged inside the joint 14. The controller 15 is a microcomputer including an input port, an output port, a computing processor and a storage. The handle 12 includes a trigger 4 and a trigger switch 41, and the trigger switch 41 is turned ON when an operator applies an operational force to the trigger 4. When the operator cancels the operational force exerted on the trigger 4, the trigger switch 41 is turned OFF.

Figure 3:
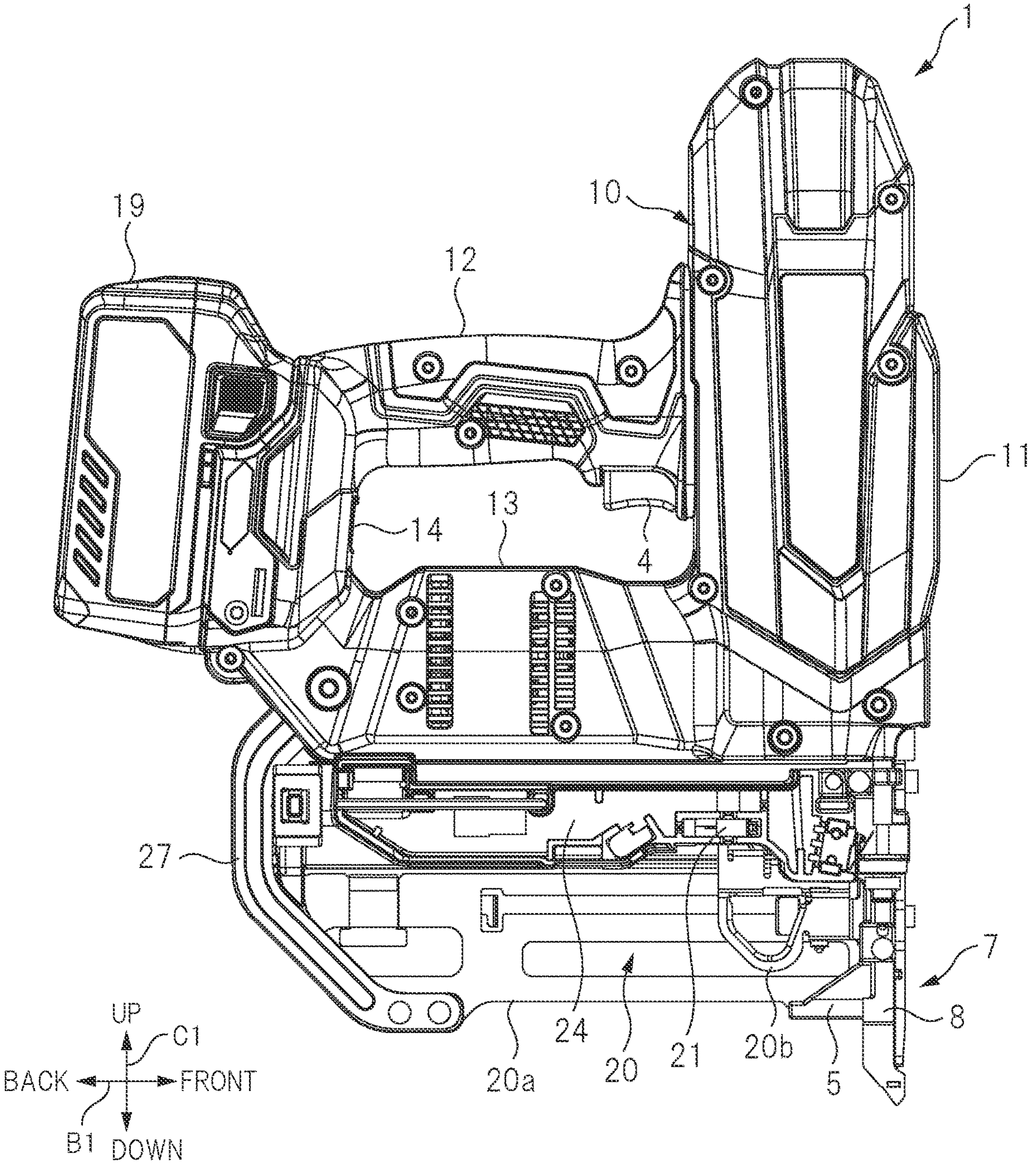
FIG. 3 is a side view showing a partial internal structure of the driving device shown in FIG. 1.

As shown in FIG. 3, a holder 24 and a magazine 20 are arranged to be opposite to the handle 12 of the motor case 13. The magazine 20 includes a plate-type base member 20*a* that can house a plurality of fasteners 6 (see FIG. 9) struck by the striking portion 30. Further, the magazine 20 includes a feeder 20*b* supplying the plurality of housed fasteners 6 one by one to the ejecting path 2. The fastener 6 fed to the ejecting path 2 of the ejecting portion 7 by the feeder 20*b* is struck by the striking portion 30 moving toward the downside D1 shown in FIG. 4. Then, the fastener 6 is ejected from an ejecting port 3 that is an outlet of the ejecting path 2, and is driven into the workpiece. More specifically, a head of the fastener 6 fed from the base member 20*a* of the magazine 20 to the ejecting path 2 by the feeder 20*b* is struck by the driver blade 32 moving toward the downside D1.

Note that the push lever switch 9 is turned ON when the operator applies the operational force to the trigger 4 to turn ON the trigger switch 41 and pushes the push lever 8 against the workpiece. Then, the controller 15 applies a voltage to the electrical motor 16 to rotate the motor shaft 17. A rotary force of the motor shaft 17 is amplified by a speed reducer 18, and is transmitted to the first gear 42 to rotate the first gear 42, the second gear 43 and the third gear 44. Then, the striking portion 30 is ascended from a standby position by engagement of at least either a cam roller of the first gear 42 or a cam roller of the second gear 43. And, the weight 34 is descended by engagement of a cam roller of the third gear 44.

Then, when both the cam roller of the first gear 42 and the cam roller of the second gear 43 are released from the engagement, the striking portion 30 is descended by the biasing force of the spring 35. When the cam roller of the third gear 44 is released from the engagement, the weight 34 is ascended by the biasing force of the spring 35. The driver blade 32 strikes one fastener 6 having been fed from the base member 20*a* of the magazine 20 and having reached the ejecting path 2, and therefore, the fastener 6 is driven into the workpiece.

After the driver blade 32 strikes the fastener 6, the plunger 31 collides with the plunger bumper 37. The plunger bumper 37 absorbs a part of kinetic energy of the striking portion 30. Also, the weight 34 collides with the weight bumper 36. The weight bumper 36 absorbs a part of kinetic energy of the weight 34. When the striking portion 30 moves toward the downside D1 and strikes the fastener 6 as described above, the weight 34 can reduce the backlash generated when the striking portion 30 strikes the fastener 6.

The controller 15 rotates the electrical motor 16 even after the operator separates the push lever 8 from the workpiece and turns OFF the trigger switch 41 after the fastener 6 is driven into the workpiece. Then, the striking portion 30 ascends from a bottom dead point to be against the biasing force of the spring 35, and the plunger 31 separates from the plunger bumper 37. The controller 15 stops the electrical motor 16 when detecting that the striking portion 30 reaches the standby position.

Next, the magazine 20 of the driving device 1 will be explained in detail.

Figure 6:
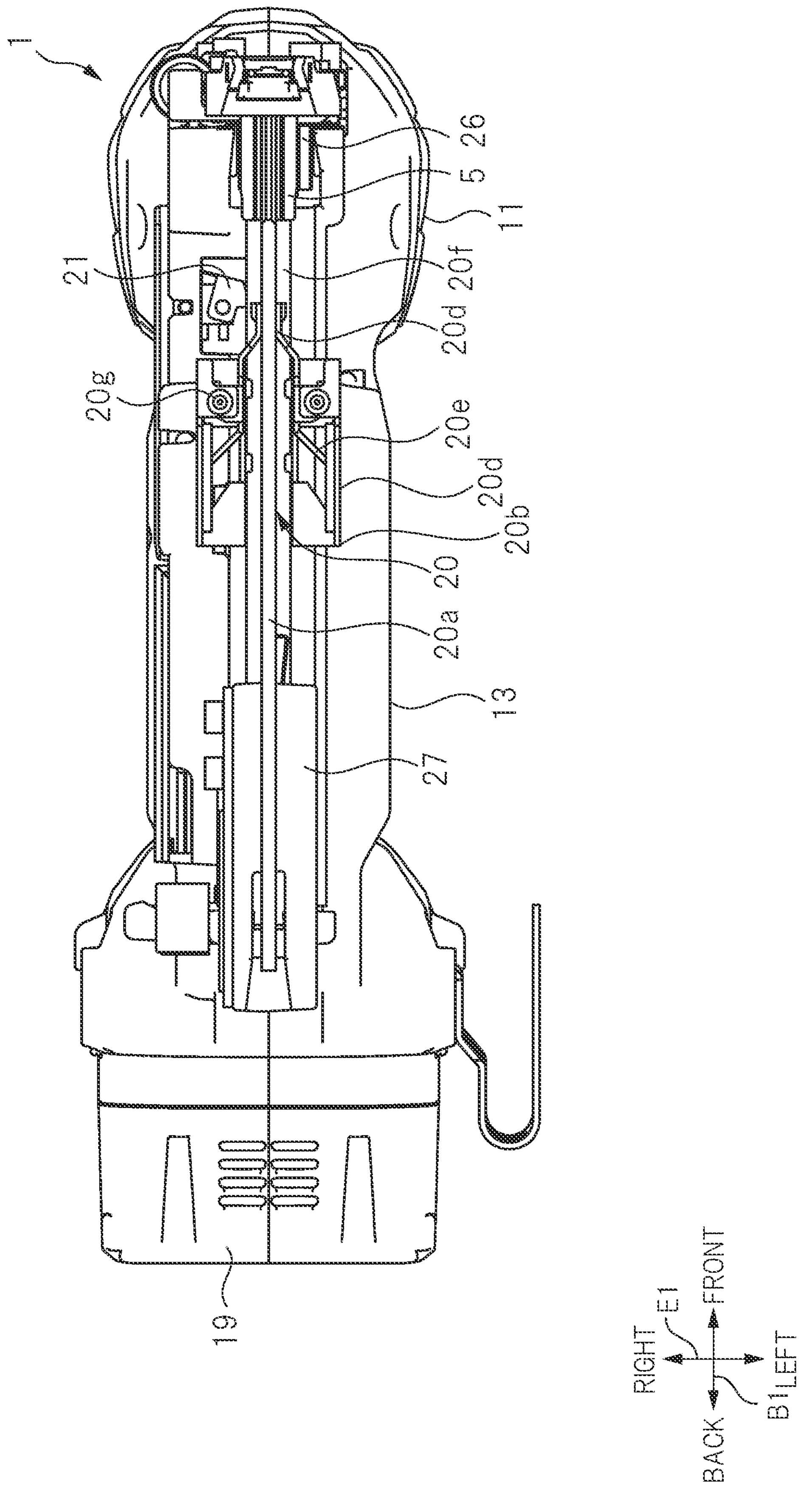
FIG. 6 is a bottom view showing a partial internal structure of the driving device shown in FIG. 1.
Figure 7:
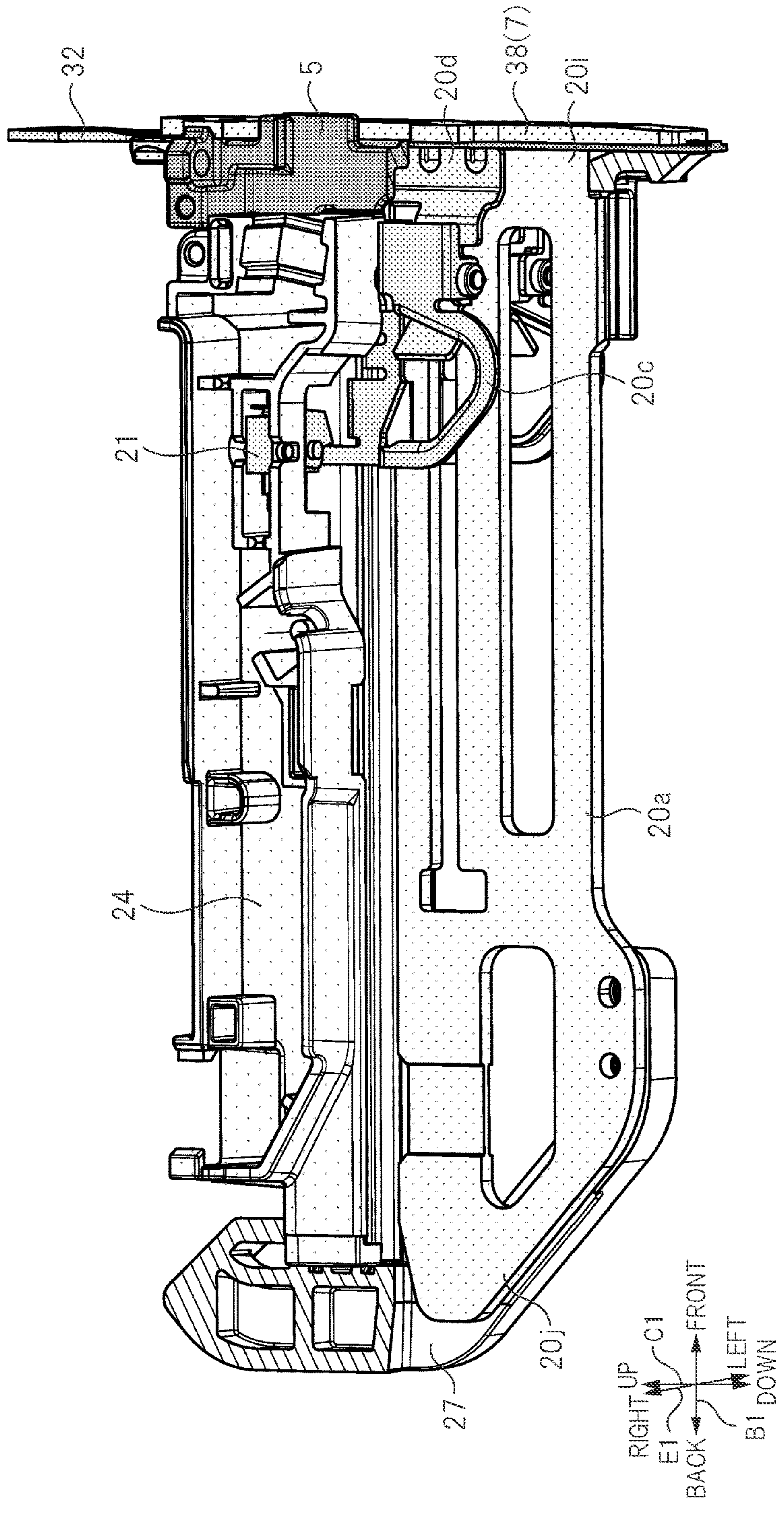
FIG. 7 is a perspective view showing a structure including a magazine and a holder of the driving device shown in FIG. 1.

As shown in FIG. 4, the magazine 20 includes: the base member 20*a* extending in the front and back direction (first direction) B1 and formed into the plate shape; the feeder 20*b* being movable in the front and back direction B1 and being biased toward one side in the front and back direction B1; and a rail (guide) 20*f* guiding movement of the feeder 20*b* in the front and back direction B1 and shown in FIG. 6. The base member 20*a* can catch the fastener 6 to be movable in the front and back direction B1. As shown in FIG. 7, a one-side end 20*i* of the base member 20*a* in the front and back direction B1 is attached to the ejecting portion 7, and an other-side end 20*j* of the base member 20*a* in the front and back direction B1 is open to allow the fastener 6 to be inserted, caught and separated. The feeder 20*b* is switchable between a contact state representing contact with the fastener 6 caught with the base member 20*a* and a contactless state representing contactless with the fastener 6 at the time of movement in the front and back direction B1.

As shown in FIG. 4, the driving device 1 of the present embodiment includes a detector 21 detecting a position of the feeder 20*b* in the front and back direction B1. As shown in FIG. 6, note that the feeder 20*b* includes: a base portion 20*c* moving in the front and back direction B1 while being caught with the rail 20*f*; and a contact portion 20*d* attached to the base portion 20*c*, and the detector 21 detects a position of the base portion 20*c*. In the driving device 1, the detector 21 detects that the base portion 20*c* reaches a predetermined position of the detector 21.

In this case, the rail 20*f* is attached to the ejecting portion 7 as shown in FIG. 7. The holder 24 is attached to the ejecting portion 7, and the detector 21 is arranged in this holder 24. As shown in FIG. 4, the main body housing 11 housing the striking portion 30 is attached to the ejecting portion 7. Further, the magazine 20 includes a handle arm (arm) 27 arranged on the other side of the holder 24 in the front and back direction B1 (that is the backside far from the ejecting portion 7). The handle arm 27 is attached to the housing 10 and the base member 20*a*.

Figure 5:
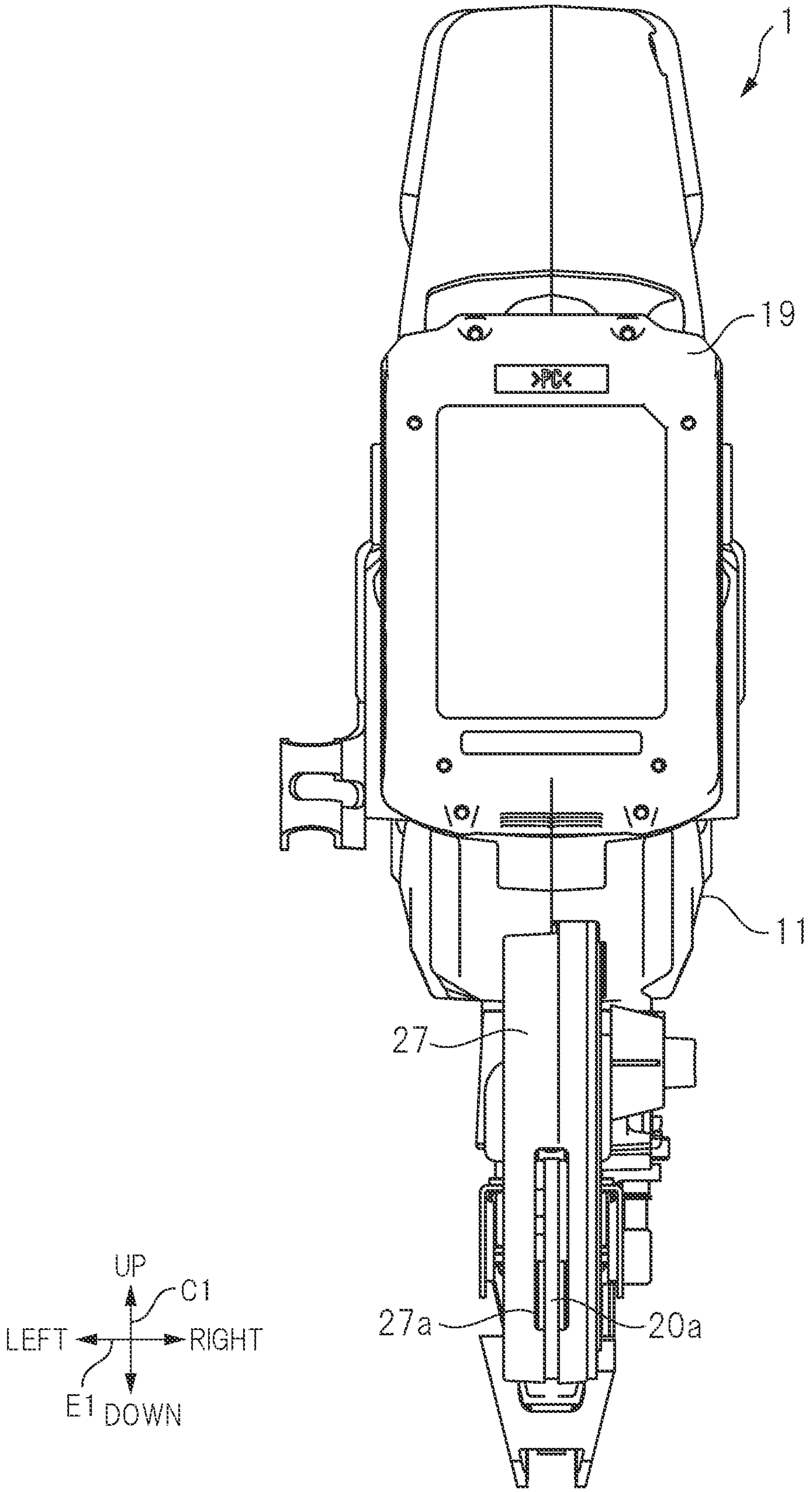
FIG. 5 is an explanatory view showing appearance of the driving device shown in FIG. 1 as viewed from back side.

As shown in FIG. 5, an opening 27*a* where the base member 20*a* is arranged is formed on a backside of the handle arm 27, and the fastener 6 is loaded through this opening 27*a*. In other words, the driving device 1 is a driving device 1 of a rear loading type in which the fastener 6 is loaded from the backside of the driving device 1.

Figure 9:
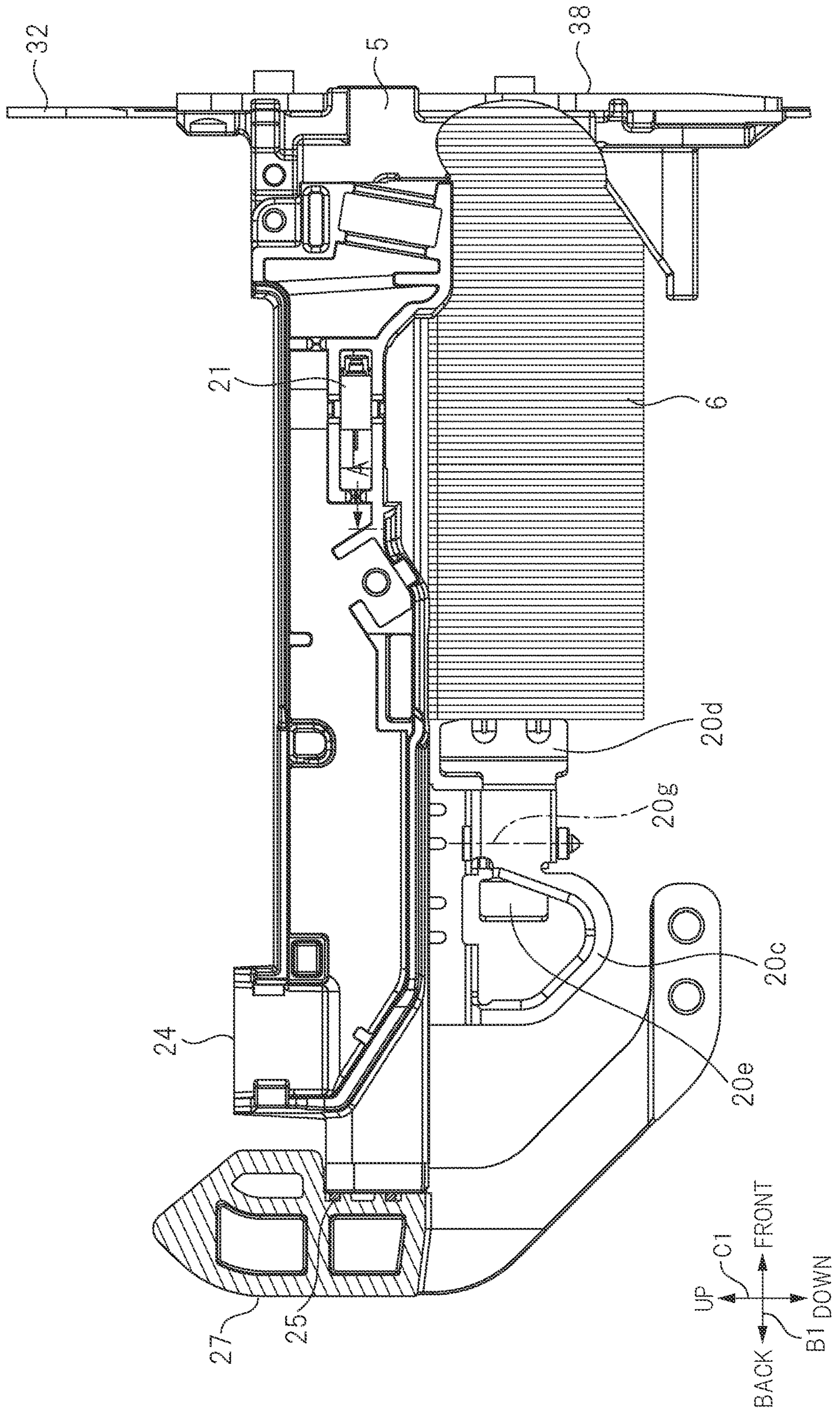
FIG. 9 is an explanatory view showing a structure in which a fastener is loaded to the structure shown in FIG. 8.
Figure 10:
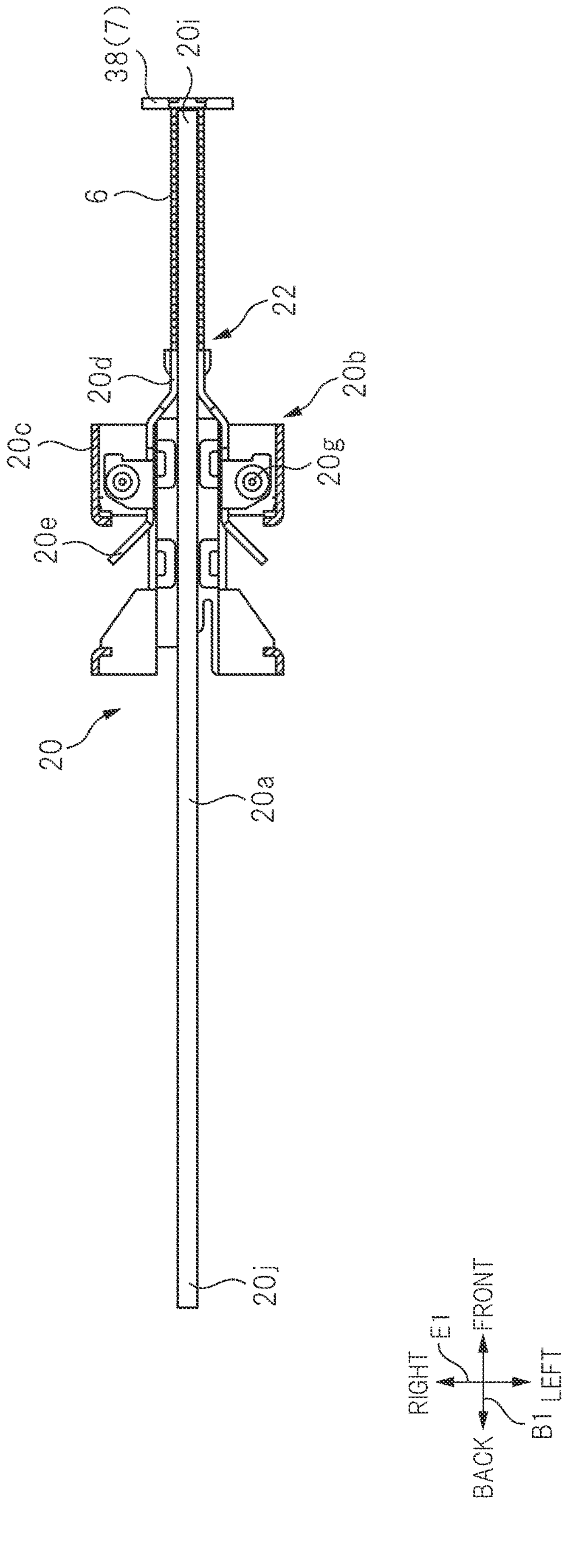
FIG. 10 is an explanatory view showing a state of a first position of a contact portion in the feeder of the driving device shown in FIG. 1.
Figure 11:
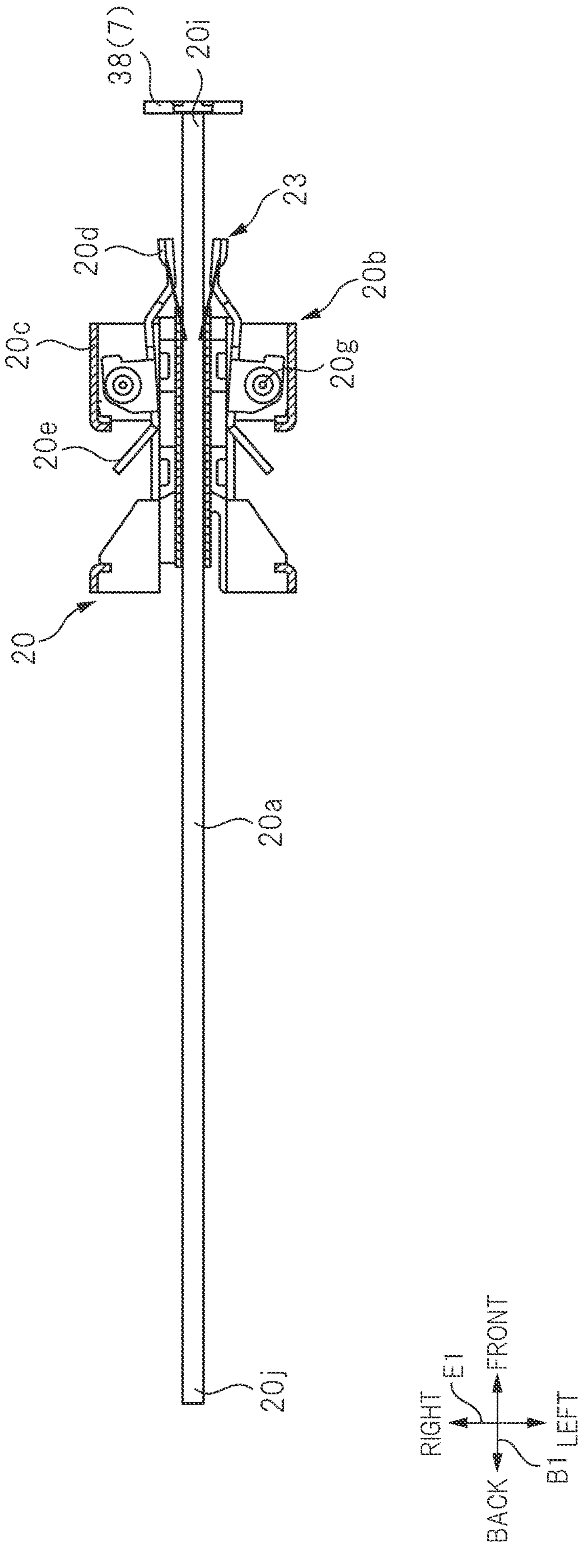
FIG. 11 is an explanatory view showing a state of a second position of the contact portion shown in FIG. 10.

As shown in FIGS. 9 and 10, by the operator's operation, the contact portion 20*d* of the feeder 20*b* pushing the fastener 6 toward the ejecting portion 7 including the guide plate 38 can be moved between a first position 22 corresponding to the contact state and a second position 23 corresponding to the contactless state shown in FIG. 11.

Figure 8:
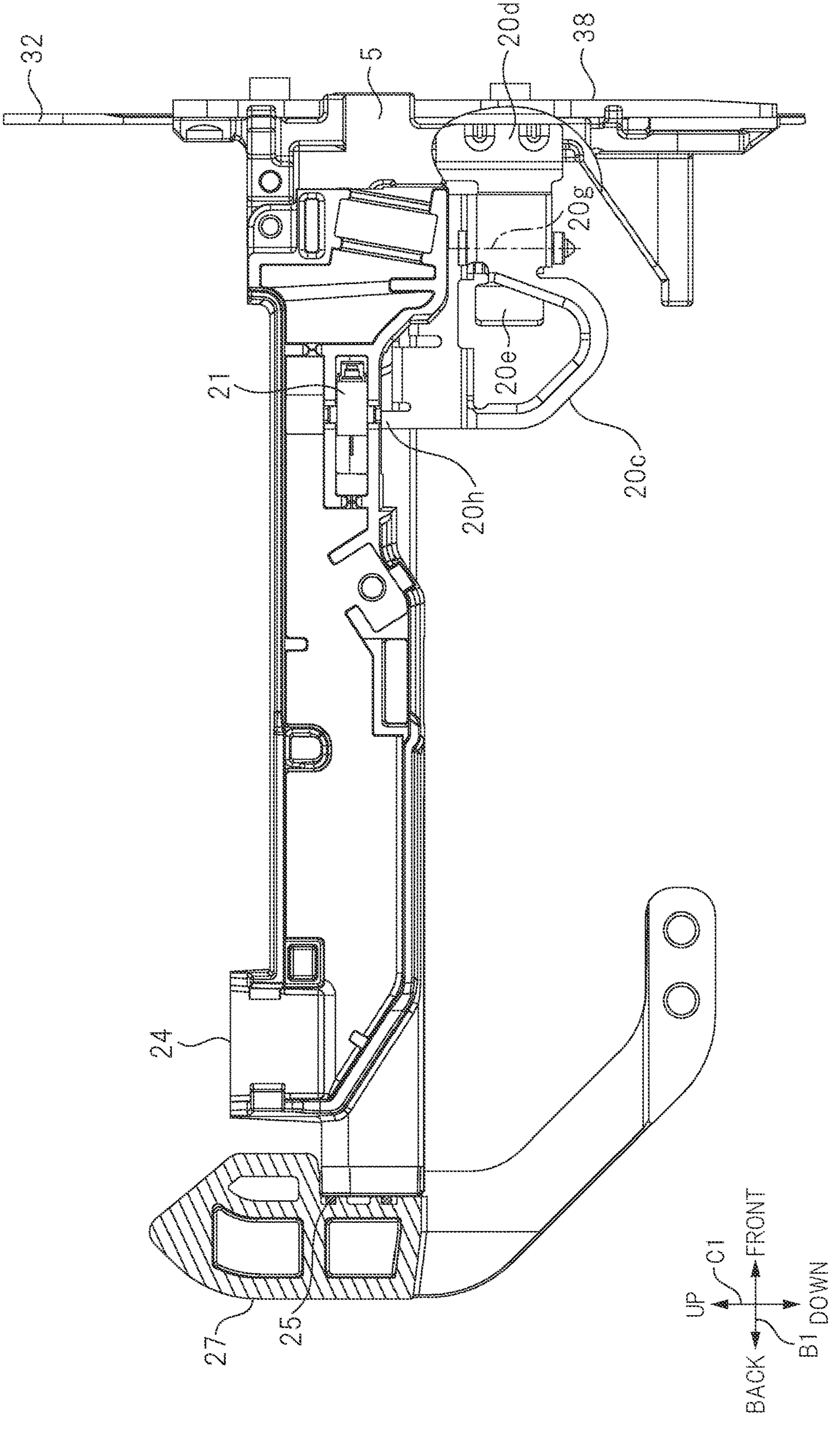
FIG. 8 is an explanatory view showing a structure including a feeder and the holder of the driving device shown in FIG. 1.

As shown in FIGS. 8 and 9, the contact portion 20*d* swings about a swing axis 20*g* extending in the up and down direction (second direction) C1 crossing the front and back direction B1 to move between the first position 22 and the second position 23. More specifically, the contact portion 20*d* is coupled with a back end portion 20*e*, and is supported by the base portion 20*c* to be swing about the swing axis 20*g*. As shown in FIGS. 10 and 11, such structures of the contact portion 20*d*, the back end portions 20*e* and the base portion 20*c* are arranged as the feeder 20*b* on both sides of the plate-shaped base member 20*a* in the right and left direction E1. In other words, in the structure of the feeder 20*b*, the back end portions 20*e* are arranged on the both sides of the base member 20*a* to form an upside down V shape to be open. And, when the back end portions 20*e* on the both sides of the base member 20*a* are pinched (pushed) inward, the contact portions 20*d* on the both sides swing about the swing axis 20*g*. In this manner, the contact portions 20*d* being on the both sides and being in contact with the base member 20*a* swing, are open outward as shown in FIG. 11, and separate from the base member 20*a*. In other words, the feeder 20*b* is switchable between the contact state representing the contact with the fastener 6 caught with the base member 20*a* and the contactless state representing the contactless with the fastener 6 at the time of the movement in the front and back direction B1.

When the fastener 6 is loaded to the driving device 1, the fastener 6 is loaded through the opening 27*a* of the handle arm 27 shown in FIG. 5 to the base member 20*a*. When the operator pushes the back end portions 20*e* on the both sides inward after the loading, the contact portions 20*d* on the both sides are made open to form a gap between the contact portions 20*d* and the base member 20*a*. In this state, the fastener 6 is passed through the gap between the contact portions 20*d* and the base member 20*a*, and the fastener 6 is arranged on the front side of the contact portions 20*d* as shown in FIG. 10. Then, when the inward pushing on the back end portions 20*e* is released, the contact portions 20*d* are brought in contact with the base member 20*a*, and can be brought in contact with the fastener 6.

Next, the detector 21 shown in FIG. 12 will be explained. The driving device 1 includes the detector 21 detecting the position of the feeder 20*b* moving in the front and back direction B1. The detector 21 is electrically connected to the battery pack 19, and is a switch for switching whether to activate the electrical motor 16.

The detector 21 includes: a lever 21*c* allowed to swing and be contacted with a pushing portion 20*h* that is a part of the feeder 20*b* shown in FIG. 11; and a detector main body 21*a* switching whether to activate the electrical motor 16 when being pushed by the swing of the lever 21*c*. The detector main body 21*a* includes a protrusion 21*b* pushed by the lever 21*c*. In other words, in the feeder 20*b* moving frontward every time the fastener 6 is driven in, the protrusion 21*b* is not pushed by the lever 21*c* until the pushing portion 20*h* pushes the lever 21*c*, the detector main body (switch) 21*a* is, for example, turned OFF, and the electrical motor 16 is in an activatable state (is allowed to be activated). In other words, the fastener 6 having been not driven in yet still remains on the base member 20*a*, and the driving-in operation can be performed.

Figure 12A:
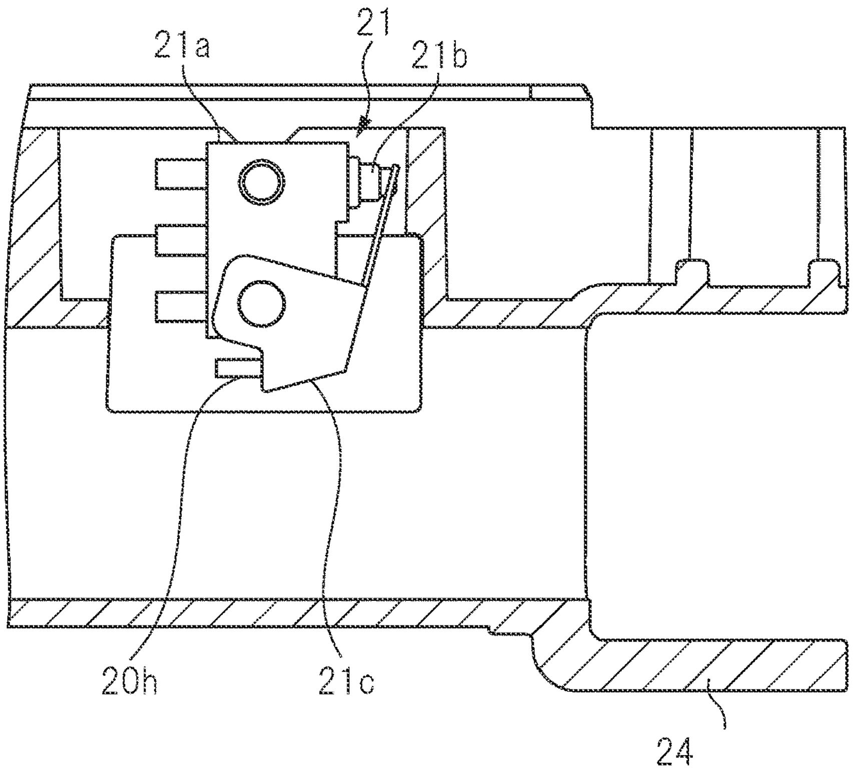
FIGS. 12A and 12B are plan views showing a structure of a detector of the driving device shown in FIG. 1.
Figure 12B:
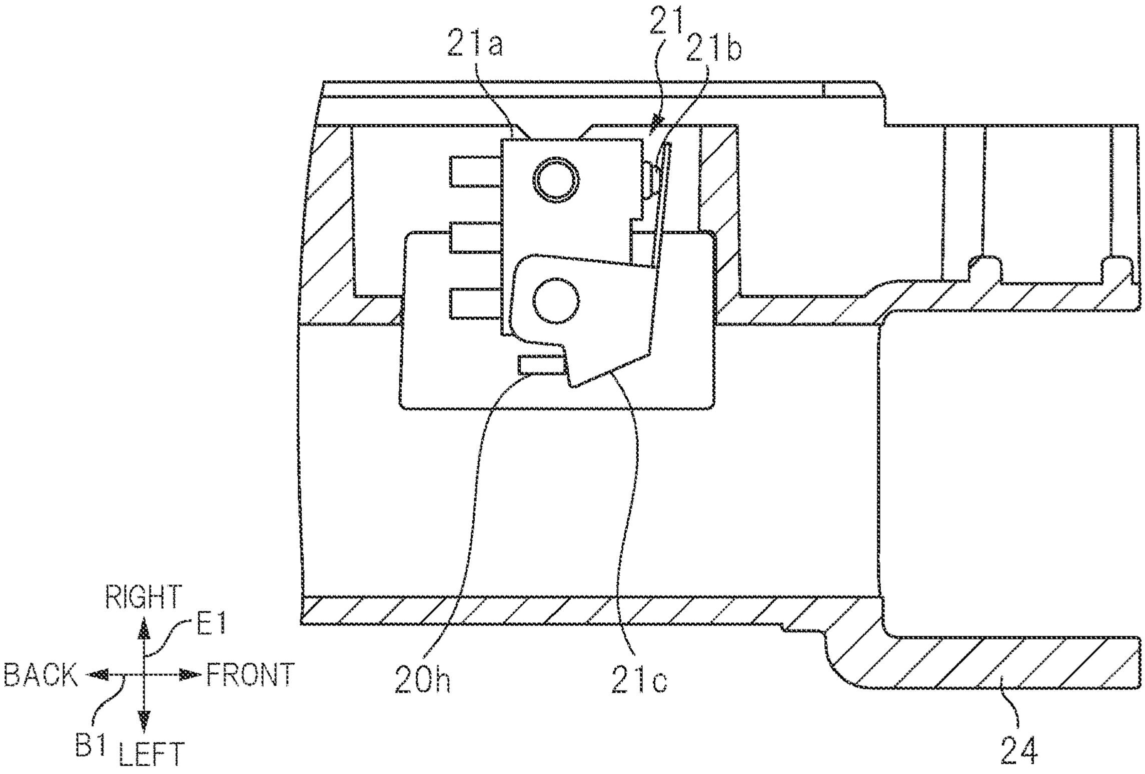

On the other hand, when the pushing portion 20*h* of the feeder 20*b* pushes the lever 21*c* as shown in FIG. 12(*b*), the protrusion 21*b* is pushed by the lever 21*c*, the detector main body (switch) 21*a* is, for example, turned ON, and the electrical motor 16 is in an inactivation state (is not allowed to be activated). In the driving device 1 of the present embodiment, when there is no fastener 6 (the number of the fasteners 6 is zero) after all loaded fasteners 6 are driven in, the protrusion 21*b* is pushed by the lever 21*c*, the detector main body (switch) 21*a* is, for example, turned ON, and the electrical motor 16 is in the inactivation state (is not allowed to be activated). In this state, the driving device 1 is not allowed to perform the driving-in operation. In this manner, idle striking in the driving device 1 is prevented.

In the driving device 1 of the present embodiment, the detector main body (switch) 21*a* is preferable to detect the feeder 20*b* when the number of the fasteners 6 loaded in the base member 20*a* is zero. For this, it is necessary to detect slight movement of the feeder 20*b*, the slight movement corresponding to one fastener 6, and it is necessary to enhance accuracy of the detection for the position of the feeder 20*b* by the detector 21.

Accordingly, the detector 21 is configured so that the pushing portion 20*h* of the feeder 20*b* does not directly push the protrusion 21*b* of the detector main body 21*a* but the pushing portion 20*h* of the feeder 20*b* pushes the lever 21*c* to cause the swing of the pushed lever 21*c* to push the protrusion 21*b* of the detector main body 21*a*. In this manner, the protrusion 21*b* can be pushed even by a smaller amount of the pushing onto the lever 21*c* by the pushing portion 20*h* than an amount of the direct pushing onto the protrusion 21*b* by the pushing portion 20*h* of the feeder 20*b*, and therefore, the accuracy of the detection for the position of the feeder 20*b* can be enhanced.

Figure 13:
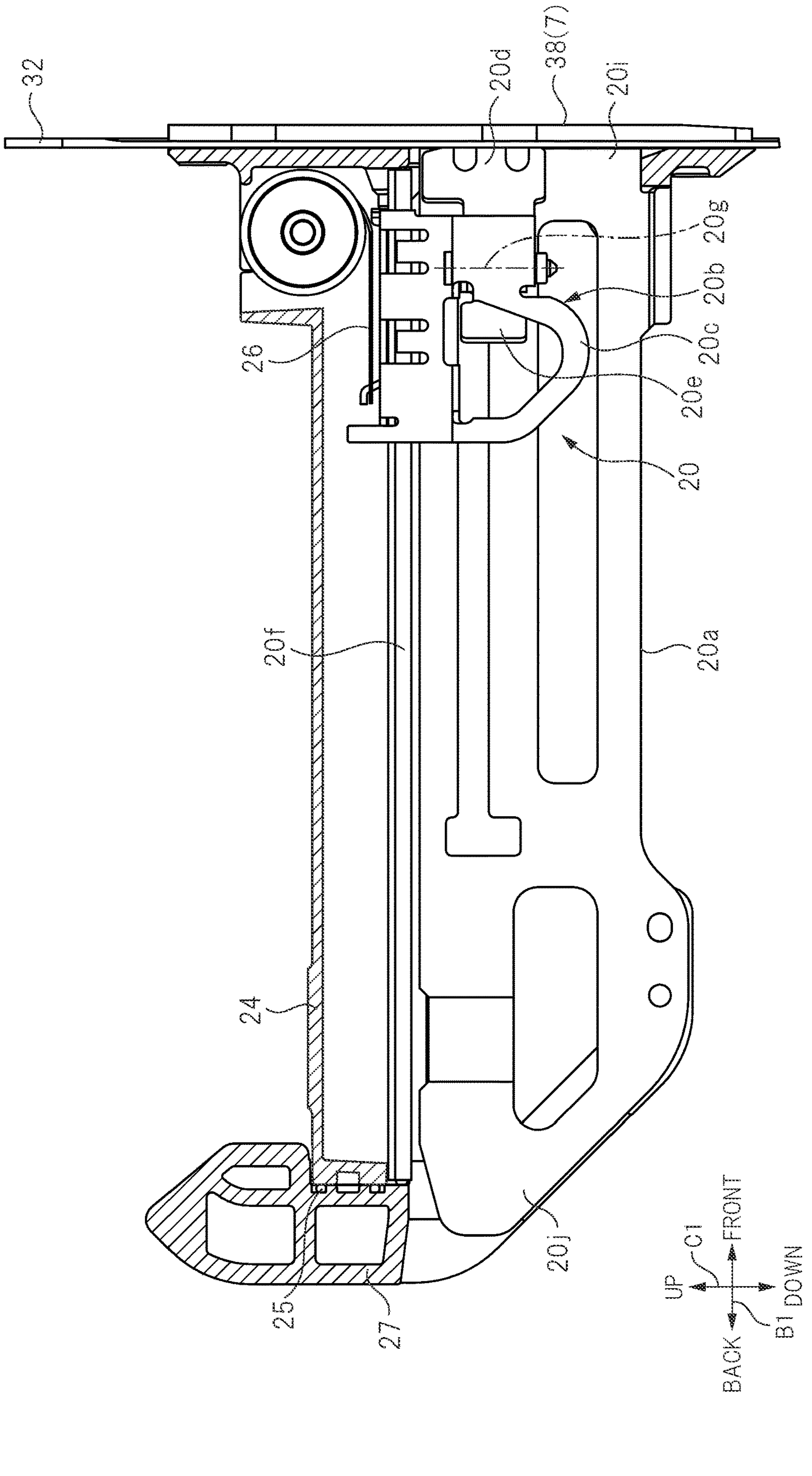
FIG. 13 is an explanatory view showing a attaching structure between the magazine and a feeder biasing portion of the driving device shown in FIG. 1.
Figure 14:
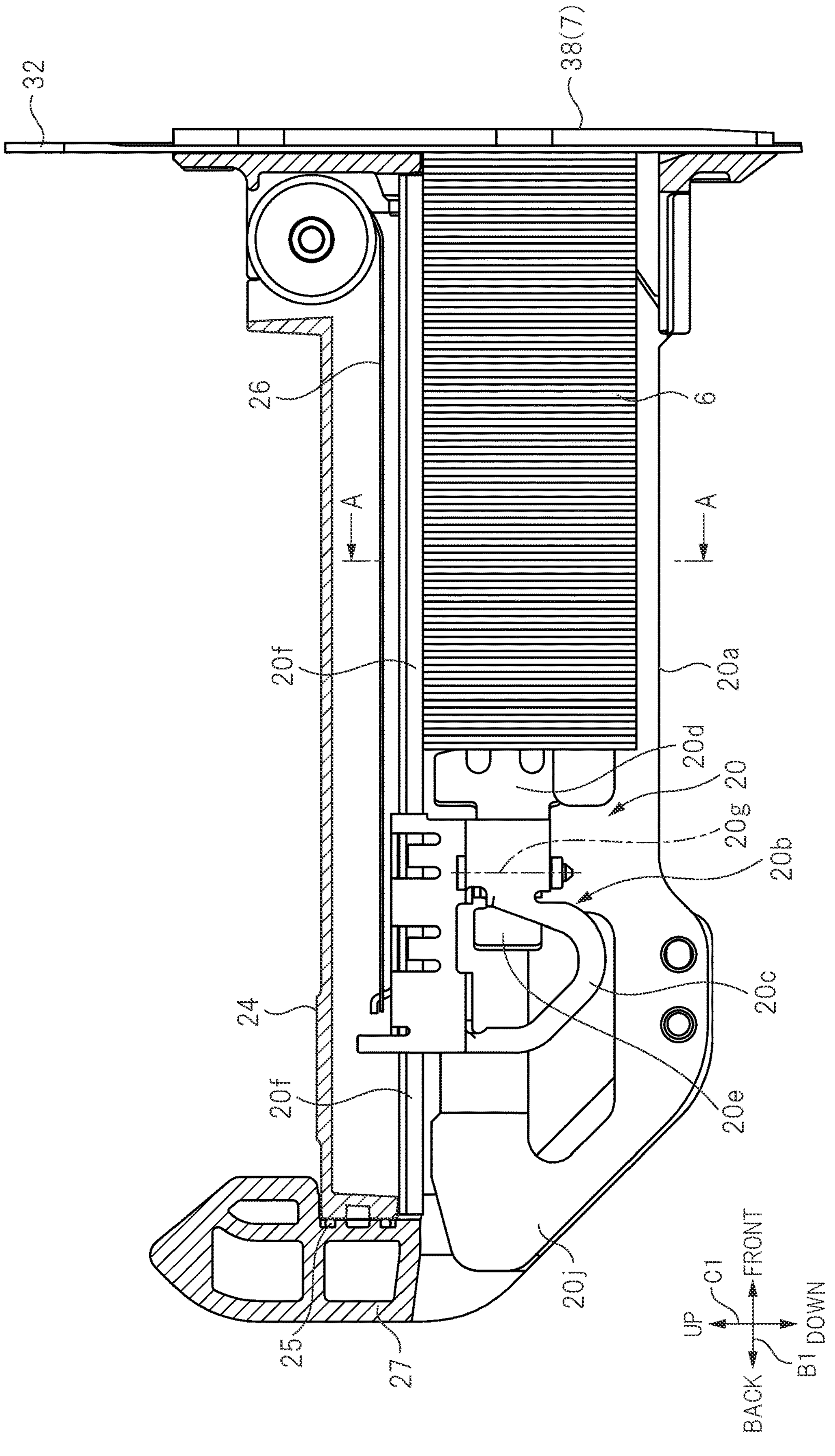
FIG. 14 is an explanatory view showing a structure in which the fastener is loaded to the attaching structure shown in FIG. 13.

As shown in FIGS. 13 and 14, the driving device 1 is provided with an elastic body (holder biasing portion) 25 biasing the holder 24 to the front side (one side) of the ejecting portion 7 in the front and back direction B1. Further, the driving device 1 is provided with a spiral spring (feeder biasing portion) 26 biasing the feeder 20*b* to the front side (one side) of the ejecting portion 7 in the front and back direction B1. Note that the driving device 1 is provided with a rubber O ring as the elastic body 25 that is the holder biasing portion. The elastic body 25 interposes between the handle arm 27 and the holder 24.

One end of the spiral spring 26 is attached to the ejecting portion 7 while the other end of the same is attached to the feeder 20*b*. The spiral spring 26 is the elastic body generating a biasing force to bring the feeder 20*b* and the ejecting portion 7 to be close to each other.

In other words, in the driving device 1, the holder 24 attached to the detector 21 is biased in a direction heading from the backside (on the handle arm 27 side) to the frontside (on the ejecting portion 7 side) by the elastic body (the rubber O ring) 25 interposing between the handle arm 27 and the holder 24. The feeder 20*b* is biased to be close to the ejecting portion 7 by the spiral spring 26 on the ejecting portion 7 side of the holder 24 when separating backward from the ejecting portion 7. In other words, the biasing force is exerted on the holder 24 and the feeder 20*b* to be close to the ejecting portion 7.

Figure 15:
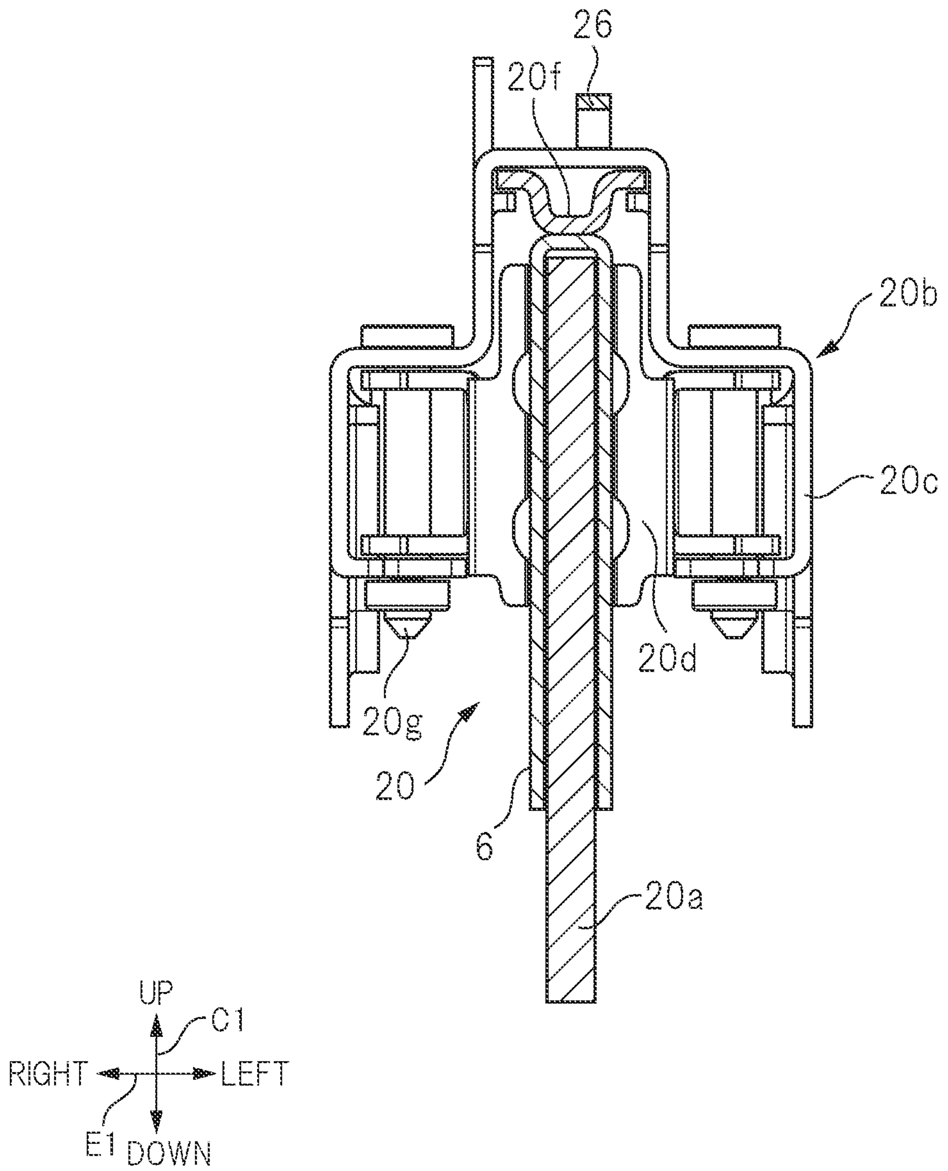
FIG. 15 is a cross-sectional view showing a structure resulted from cutting along a line A-A shown in FIG. 14.

As shown in FIG. 15, an upper portion of the fastener 6 is arranged between an upper end of the base member 20*a* of the magazine 20 and the rail 20*f*, and the spiral spring 26 is arranged to be upper than an upper portion of the base portion 20*c* guided by the rail 20*f*. Therefore, the detector 21 is arranged to be upper than the rail 20*f*.

In order to accurately detect the position of the feeder 20*b* in the driving device 1, it is preferable to accurately position the holder 24 attached to the detector 21, the base member 20*a* provided with the feeder 20*b* and others. In other words, it is necessary to suppress rattling in the attachment of the holder 24 and the base member 20*a* as less as possible.

Accordingly, the driving device 1 of the present embodiment has a rattling suppression structure as shown in FIG. 16. More specifically, the blade guide 5 and the guide plate 38 are fixed to each other by a bolt. Also, the guide plate 38 and the magazine 20 are fixed to each other by welding. Further, the magazine 20 and the handle arm 27 are fixed to each other by a bolt. In this manner, the guide plate 38, the blade guide 5, the magazine 20 and the handle arm 27 are unified as a U-shaped unified component.

Since the rubber elastic body (O ring) 25 is arranged between the holder 24 and the handle arm 27, the blade guide 5 and the holder 24 including the detector 21 are biased frontward (toward the ejecting portion 7 side) toward the guide plate 38 by the biasing force P1 of the elastic body 25.

On the other hand, the spiral spring 26 is arranged to bridge between the base portion 20*c* of the feeder 20*b* and the blade guide 5, and the base portion 20*c* of the feeder 20*b*, the contact portion 20*d* of the feeder 20*b* and the driver blade 32 are biased frontward (toward the ejecting portion 7 side) toward the guide plate 38 by the biasing force P2 of this spiral spring 26. In other words, since each of components on the detector 21 side and components on the feeder 20*b* side is biased frontward toward the guide plate 38, the rattling in the front and back direction B1 can be suppressed. In this manner, the position of the feeder 20*b* can be accurately detected, and the remaining amount of the fasteners 6 can be accurately detected. FIG. 16(*a*) shows a state in which the fastener 6 remains, and in which the fastener 6, the base portion 20*c* of the feeder 20*b*, the contact portion 20*d* of the feeder 20*b* and the driver blade 32 are biased toward the guide plate 38 by the biasing force P2 of this spiral spring 26. FIG. 16(*b*) shows a state in which the number of fasteners 6 is zero, and in which the detector 21 detects that the feeder 20*b* reaches the position of the lever 21*c* of the detector 21 when the pushing portion 20*h* of the base portion 20*c* pushes the lever 21*c* of the detector 21. In other words, the detector detects that the remaining amount of the fasteners 6 is zero.

Because of the above-described configuration, in the driving device 1 of the present embodiment, the configuration of the magazine 20 can be made of the simpler configuration, and the remaining amount of the fasteners 6 loaded in the magazine 20 can be accurately detected, and therefore, the workability of the driving device 1 can be improved. Further, the idle striking in the driving device 1 can be prevented, and therefore, the endurance of the driving device 1 can be improved.

The detector 21 does not detect the contact portion 20*d* allowed to swing but detects the base portion 20*c* of the feeder 20*b* not swinging, and therefore, the detection accuracy can be enhanced.

In the driving device 1, devisal for an arrangement position of the detector 21 is also made. For example, even if the detector 21 is tried to be arranged in the base member 20*a* of the magazine 20, the base member 20*a* has no space for the attachment of the detector 21 since the fastener 6 is loaded in the base member 20*a*. Alternatively, if the detector 21 is tried to be arranged to be lower than the fastener 6, it is difficult to wire wirings of the detector 21, and therefore, the detector 21 is preferable to be arranged to be upper than the fastener 6. However, since the movable feeder 20*b* is attached to the rail 20*f* upper than the fastener 6, the detector 21 cannot be attached to the rail 20*f*, either.

Accordingly, in the driving device 1, the detector 21 is attached to the holder 24 upper than the fastener 6. Further, the holder 24 is fixed to the blade guide 5 while being biased to the blade guide 5 by the elastic body 25, and the rail 20*f* is also fixed to the blade guide 5. More specifically, since the detector 21 in the driving device 1 is attached to the holder 24 fixed to the blade guide 5 connected with the rail 20*f*, the number of members arranged in the magazine 20 can be made as small as possible to achieve the simpler configuration of the magazine 20, and besides, the accuracy of the detection for the position of the feeder 20*b* can be further enhanced.

The present invention is not limited to the foregoing embodiments, and various modifications can be made within the scope of the present invention. For example, the above-described embodiments have been explained in the case of the rubber O ring used as the holder biasing portion and the spiral spring used as the feeder biasing portion. However, other elastic members may be used as the holder biasing portion and the feeder biasing portion.

EXPLANATION OF REFERENCE CHARACTERS

1 . . . driving device (working machine), 2 . . . ejecting path, 3 . . . ejecting port, 4 . . . trigger, 5 . . . blade guide, 6 . . . fastener, 7 . . . ejecting portion, 8 . . . push lever, 9 . . . push lever switch, 10 . . . housing, 11 . . . main body housing, 12 . . . handle, 13 . . . motor case, 14 . . . joint, 15 . . . controller, 16 . . . electrical motor, 17 . . . motor shaft, 18 . . . speed reducer, 19 . . . battery pack, 20 . . . magazine, 20*a* . . . base member, 20*b* . . . feeder, 20*c* . . . base portion, 20*d* . . . contact portion, 20*e* . . . back end portion, 20*f* . . . rail (guiding portion), 20*g* . . . swing axis, 20*h* . . . pushing portion, 20*i* and 20*j* . . . end portion, 21 . . . detector, 21*a* . . . detector main body, 21*b* . . . protrusion, 21*c* . . . lever, 22 . . . first position, 23 . . . second position, 24 . . . holder, 25 . . . elastic body (holder biasing portion), 26 . . . spiral spring (feeder biasing portion), 27 . . . handle arm (arm), 27*a* . . . opening, 30 . . . striking portion, 31 . . . plunger, 32 . . . driver blade, 33 . . . guide shaft, 34 . . . weight, 35 . . . spring, 36 . . . weight bumper, 37 . . . plunger bumper, 38 . . . guide plate, 41 . . . trigger switch, 42 . . . first gear, 43 . . . second gear, 44 . . . third gear

The invention claimed is:

1. A working machine comprising:
an ejecting portion;
a striking portion operable to strike a fastener fed to the ejecting portion;
an electric motor configured to drive the striking portion;
a magazine extending in a first direction from the ejection portion and configured to feed the fastener to the ejecting portion along a second direction which is opposite the first direction; and
a main body housing supporting the electric motor and the striking portion,
wherein the magazine includes:
a base member configured to support the fastener supplied to the magazine in a state where the fastener is movable in the first and second directions;
a feeder being movable in the second direction and biased toward the second direction; and
a guiding portion configured to guide movement of the feeder in the second direction; and
an arm attached to the main body housing and the base member,
wherein one end of the base member is attached to the ejecting portion while another end of the base member is open to allow the fastener to be supplied to the magazine,
wherein the feeder is switchable between a contact state in which the feeder is in contact with the fastener supported by the base member and a contactless state in which the feeder is not in contact with the fastener at time of the movement of the feeder in the second direction,
wherein the working machine further includes:
a holder disposed adjacent to the base member; and
a detector disposed in the holder and configured to detect a position of the feeder in the second direction,
wherein the ejecting portion, the magazine, and holder are disposed outside the main body housing,
wherein the base member has the one end connected to the ejecting portion, and extends from the one end to the another end along the first direction,
wherein the holder has one end connected to the ejecting portion and another end connected to the arm, and extends from the one end to the another end along the first direction, and
wherein the base member and the holder extend in parallel between the ejection portion and the arm.

2. The working machine according to claim 1,
wherein the feeder includes:
a base portion moving in the second direction while engaging with the guiding portion; and
a contact portion attached to the base portion to be movable between a first position corresponding to the contact state and a second position corresponding to the contactless state, and
wherein the detector detects a position of the base portion.

3. The working machine according to claim 1,
wherein the holder biasing portion is an elastic body interposed between the arm and the holder.

4. The working machine according to claim 1,
wherein one end of the feeder biasing portion is attached to the holder while the other end of the feeder biasing portion is attached to the feeder, and
wherein the feeder biasing portion is an elastic body generating a biasing force to bring the feeder and the ejecting portion to be close to each other.

5. The working machine according to claim 1,
wherein the striking portion strikes the fastener in a striking direction perpendicular to the first and second directions,
wherein the holder is disposed between the main body housing and the base member in the striking direction.

6. The working machine according to claim 1, wherein the detector is disposed on a side of the ejecting portion, in the second direction, relative to the electric motor.

7. The working machine according to claim 3,
wherein the guiding portion is disposed on one side of the base member in a third direction perpendicular to the first and second directions,
wherein the detector is disposed on one side of the guiding portion in the third direction, and
wherein the feeder biasing portion is disposed on the one side of the guiding portion in the third direction.

8. The working machine according to claim 7, wherein the detector is disposed on one side of the base member in a fourth direction perpendicular to the first and second directions and the third direction.

9. The working machine according to claim 1, further comprising:
a holder biasing portion biasing the holder toward one side of the ejecting portion in the second direction; and
a feeder biasing portion biasing the feeder toward one side of the ejecting portion in the second direction.

10. The working machine according to claim 9, wherein the feeder biasing portion is a spiral spring.

11. A working machine comprising:

an ejecting portion;

a striking portion operable to strike a fastener fed to the ejecting portion;

an electric motor configured to drive the striking portion;

a magazine configured to feed the fastener to the ejecting portion; and a main body housing supporting the electric motor and the striking portion, wherein the magazine includes:

a base member configured to support the fastener supplied to the magazine in a state where the fastener is movable in a first direction;

a feeder being movable in the first direction and biased toward one side in the first direction; and a guiding portion configured to guide movement of the feeder in the first direction, wherein one side end of the base member in the first direction is attached to the ejecting portion while another side end of the base member in the first direction is open to allow the fastener to be supplied to the magazine, wherein the feeder is switchable between a contact state in which the feeder is in contact with the fastener supported by the base member and a contactless state in which the feeder is not in contact with the fastener at time of the movement of the feeder in the first direction, wherein the working machine includes a detector detecting a position of the feeder in the first direction, wherein the feeder includes:

a base portion configured to move in the first direction while engaging with the guiding portion; and a contact portion attached to the base portion to be movable between a first position corresponding to the contact state and a second position corresponding to the contactless state, wherein the detector detects a position of the base portion, and wherein the contact portion moves between the first position and the second position when swinging about a swing axis extending in a second direction crossing the first direction.

12. A working machine comprising:

an ejecting portion;

a striking portion operable to strike a fastener fed to the ejecting portion;

an electric motor configured to drive the striking portion;

a magazine configured to feed the fastener to the ejecting portion; and a main body housing supporting the electric motor and the striking portion, wherein the magazine includes:

a base member configured to support the fastener supplied to the magazine in a state where the fastener is movable in a first direction;

a feeder being movable in the first direction and biased toward the first direction; and a guiding portion configured to guide movement of the feeder in the first direction, wherein one side end of the base member in the first direction is attached to the ejecting portion while another side end of the base member in the first direction is open to allow the fastener to be supplied to the magazine, wherein the feeder is switchable between a contact state in which the feeder is in contact with the fastener supported by the base member and a contactless state in which the feeder is not in contact with the fastener at time of the movement of the feeder in the first direction, wherein the working machine includes a detector detecting a position of the feeder in the first direction, and wherein the detector includes:

a lever allowed to swing and be contacted with a part of the feeder; and a detector main body including a protrusion switching whether to activate the electric motor for operating the striking portion when being pushed by swing of the lever.

* * * * *